(12) United States Patent
Arasaratnam

(10) Patent No.: US 8,396,842 B2
(45) Date of Patent: Mar. 12, 2013

(54) EXTERNALIZED DATA VALIDATION ENGINE

(75) Inventor: Omkharan Arasaratnam, Ontario (CA)

(73) Assignee: International Business Machines Corporation, Armonk, NY (US)

(*) Notice: Subject to any disclaimer, the term of this patent is extended or adjusted under 35 U.S.C. 154(b) by 14 days.

(21) Appl. No.: 13/052,220

(22) Filed: Mar. 21, 2011

(65) Prior Publication Data

US 2012/0246124 A1  Sep. 27, 2012

(51) Int. Cl.
*G06F 7/00* (2006.01)
(52) U.S. Cl. ............ 707/692; 707/608; 707/754; 726/1
(58) Field of Classification Search .................. 707/608, 707/754, 687–780
See application file for complete search history.

(56) References Cited

U.S. PATENT DOCUMENTS

| | | | |
|---|---|---|---|
| 7,231,661 B1 | 6/2007 | Villavicencio et al. | |
| 7,299,408 B1 | 11/2007 | Daconta et al. | |
| 7,313,812 B2 | 12/2007 | Robinson et al. | |
| 7,313,822 B2 | 12/2007 | Ben-Itzhak | |
| 7,389,539 B1 | 6/2008 | Kouznetsov | |
| 7,562,388 B2 | 7/2009 | Hackenberger et al. | |
| 7,716,727 B2 | 5/2010 | Phillips et al. | |
| 7,809,882 B1 * | 10/2010 | Liu et al. | 711/113 |
| 2007/0180126 A1 | 8/2007 | Merkh et al. | |
| 2007/0220602 A1 | 9/2007 | Ricks et al. | |
| 2008/0040790 A1 | 2/2008 | Kuo | |
| 2009/0060197 A1 * | 3/2009 | Taylor et al. | 380/277 |
| 2009/0240707 A1 * | 9/2009 | Bucsa et al. | 707/100 |
| 2009/0300192 A1 | 12/2009 | Northrup | |
| 2012/0136726 A1 * | 5/2012 | Caller | 705/14.66 |

* cited by examiner

*Primary Examiner* — Tony Mahmoudi
*Assistant Examiner* — Tuan-Khanh Phan
(74) *Attorney, Agent, or Firm* — Schmeiser, Olsen & Watts; John Pivnichny

(57) ABSTRACT

A method and system of externalized data validation. Data input to applications is received. Metadata specifying types of the received data is received. Methods to cleanse the received data are determined based on the metadata. Based on the determined methods and received metadata, a validation engine external to the applications cleanses and validates the received data. The validated data is sent to the applications for use by the applications. Via a subscription service and without requiring updates to the applications, a service provider provides dynamic updates of the validation engine to mitigate newly identified events associated with input to the applications.

17 Claims, 6 Drawing Sheets

US 8,396,842 B2

EXTERNALIZED DATA VALIDATION ENGINE

TECHNICAL FIELD

The present invention relates to a data processing method and system for validating data, and more particularly to a secure, subscription-based data cleansing technique for input validation.

BACKGROUND

Software applications are faced with potential breaches of security that are instantiated through a flawed implementation of a data validation routine. In known applications, aspects of data input validation are hard-coded in the applications, thereby making updates to the data validation routines time-consuming and costly. Known Intrusion Detection Systems and Intrusion Protection Systems detect rogue input (e.g., buffer overflow, SQL injection, etc.), but provide for inelegant handling of security exceptions by resorting to ending a Transmission Control Protocol (TCP) connection with a reset flag. Further, a security audit of the individually developed validation modules is expensive because the audit must be performed on a per-application basis. Thus, there exists a need to overcome at least one of the preceding deficiencies and limitations of the related art.

BRIEF SUMMARY

Embodiments of the present invention provide a method of validating data. The method comprises:

a computer receiving data input to a plurality of software applications;

the computer receiving metadata specifying types of the received data;

the computer determining methods to cleanse the received data based on the received metadata;

the computer cleansing and validating the received data based on the received metadata and based on the methods to cleanse the received data, the cleansing and validating resulting from the computer running a software-based validation engine, and the validation engine being external to the plurality of software applications; and the computer sending the validated data to the plurality of software applications for use by the plurality of software applications.

In one aspect of one or more of the aforementioned embodiments, the method further comprises:

the computer receiving code from a service provider for an update of the validation engine, wherein the update of the validation engine addresses a new event associated with input to a software application of the plurality of software applications, and wherein the receiving code is based on a subscription to the update of the validation engine;

the computer updating the validation engine with the received code; and the computer running the updated validation engine to mitigate the new event associated with input to the software application without requiring the software application to be updated.

A system, program product and a process for supporting computing infrastructure where the process provides at least one support service are also described herein, where the system, program product and process for supporting computing infrastructure correspond to the aforementioned method.

Embodiments of the present invention provide a validation engine in a subsystem that is separate from the applications whose data is being validated by the validation engine. Being in a separate subsystem, a compromise of the validation engine does not compromise systems that have more sensitive data (e.g., a database utilized by one of the applications). Further, validation rules are updated quickly and efficiently without having to change core application code. Still further, a library of known valid input is used for validation throughout an enterprise, thereby reducing the amount of time spent in testing and certifying the applications. Further yet, performance of the applications can improve because the validation tasks are offloaded to a separate subsystem. Moreover, the validation engine may avoid subsequent runs of an expensive validation routine (e.g., a Luhn routine) by caching the validation result of input to a first application, and then providing the result to a second application that needs validation of the same input.

DETAILED DESCRIPTION

Overview

Embodiments of the present invention may provide a method and system for validating data being input to software applications, where the validation is performed by a validation engine residing in a subsystem that is external to the systems and/or subsystems that run the software applications. Rather than performing input validation themselves, the software applications send the input data along with metadata describing the type of input to the validation engine. A service provider may provide a subscription-based, dynamic updating of the validation engine, thereby flexibly allowing the validation engine to address newly identified events associated with input to the applications, without requiring an update of the code of the applications. The updated validation engine ensures that the latest best practices for secure input validation are available for each application. As used herein, an event is defined as a happening, action or circumstance that has the potential to breach security and cause harm to a system by exploiting a vulnerability of the system.

Externalized Data Validation System

Figure 1:
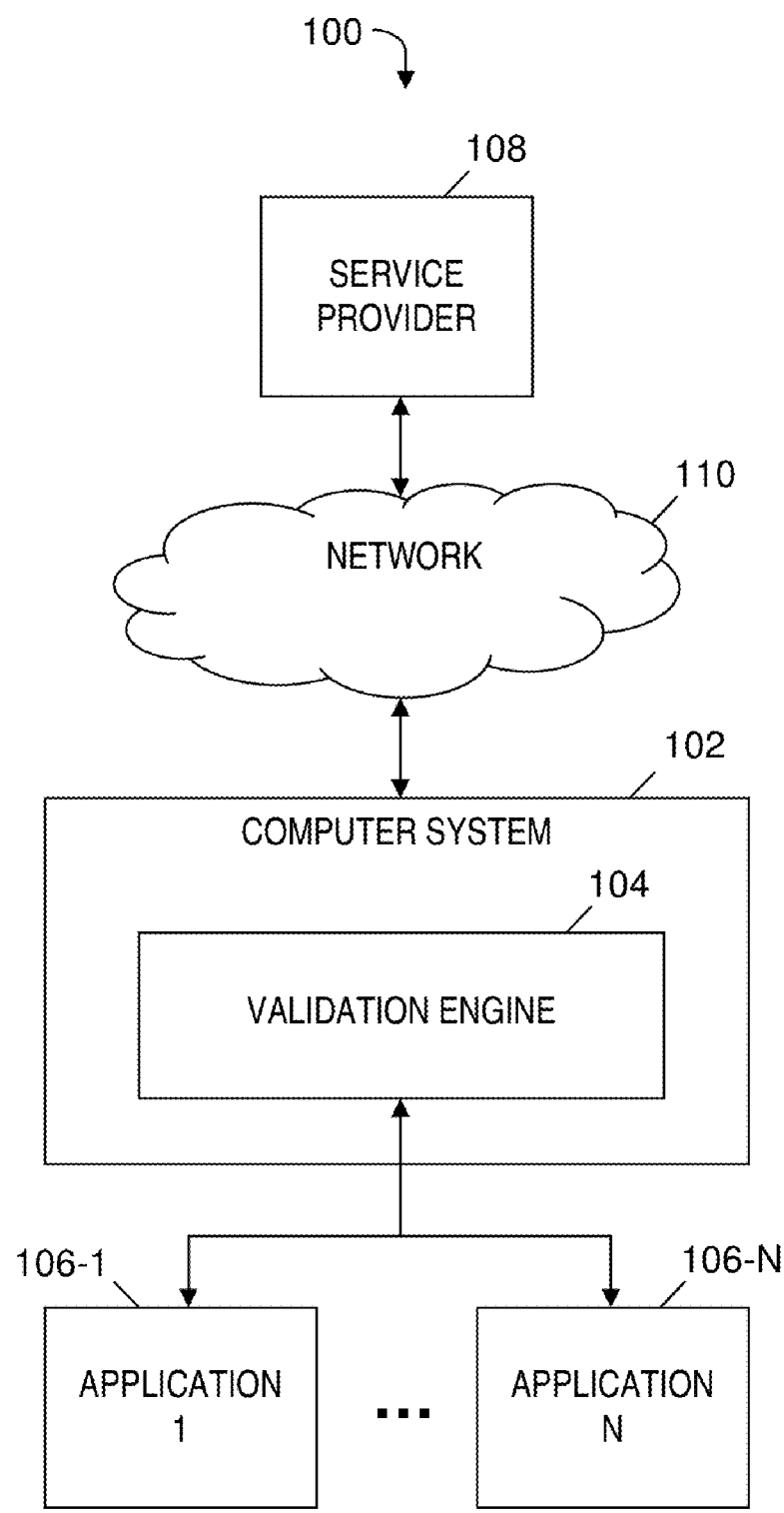
FIG. 1 is a block diagram of a system for externalized data validation, in accordance with embodiments of the present invention.

FIG. 1 is a block diagram of a system for externalized data validation, in accordance with embodiments of the present invention. System 100 includes a computer system 102 that runs a software-based validation engine 104, which is external to a plurality of software applications 106-1 . . . 106-N, where N is an integer and N≧2. Validation engine 104 receives input data and associated metadata from applications 106-1 . . . 106-N, and cleanses and validates the received data. In one embodiment, computer system 102 receives dynamic updates of validation engine 104 from service provider 108 via a network 110 (e.g., the Internet). An enterprise that utilizes, controls or operates applications 106-1 . . . 106-N may obtain (e.g., purchase) a subscription provided by service provider 108 to ensure that validation engine 104 is updated as needed to protect against newly identified events associated with input to the applications. The functionality of the components of system 100 is described in more detail below in the discussions of FIG. 2, FIG. 3 and FIG. 4.

Externalized Data Validation Process

Figure 2:
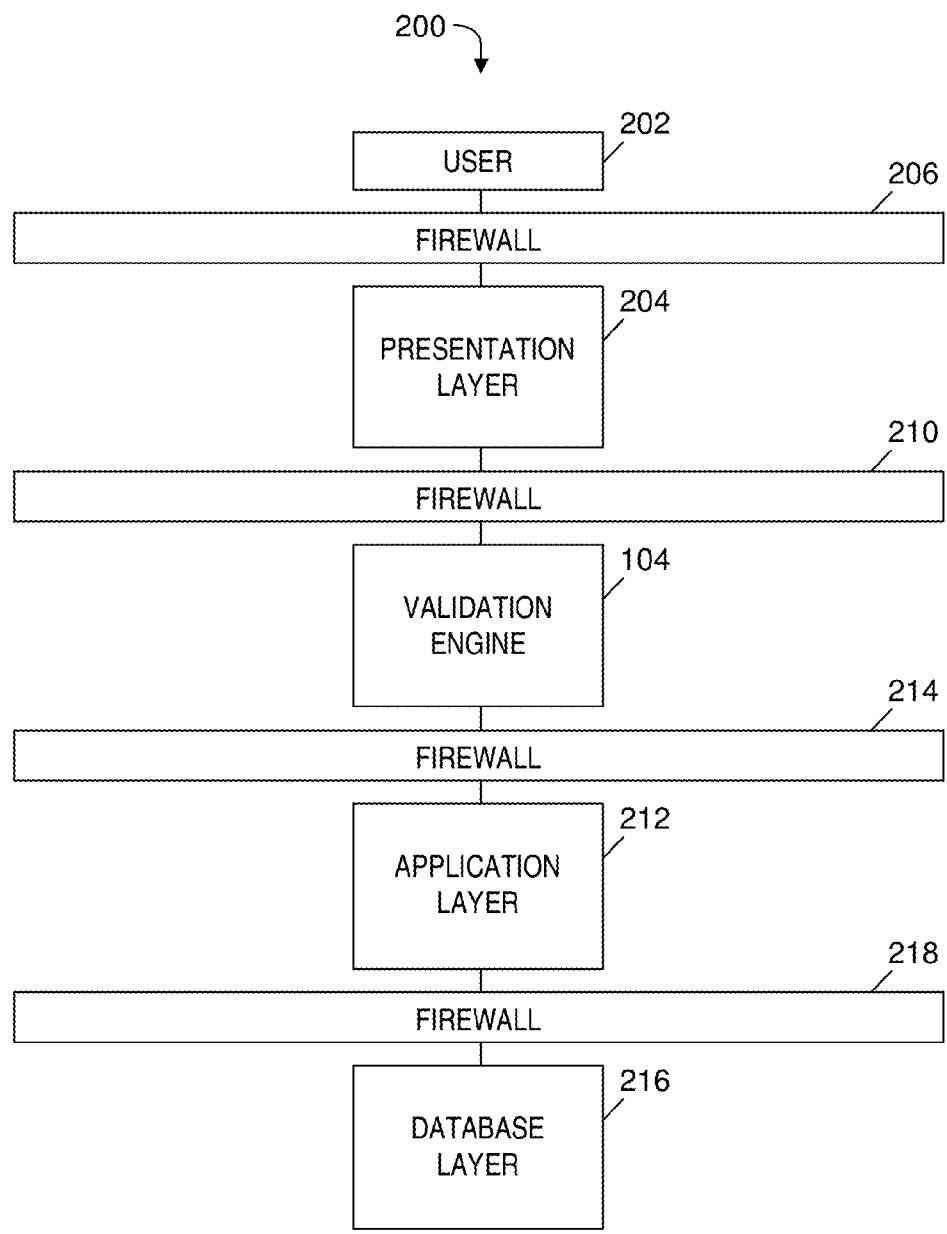
FIG. 2 is a work flow depicting a process of externalized data validation that is implemented in the system of FIG. 1, in accordance with embodiments of the present invention.

FIG. 2 is a work flow depicting a process of externalized data validation that is implemented in the system of FIG. 1, in accordance with embodiments of the present invention. In one embodiment, work flow 200 includes a user 202 who submits data to a presentation layer 204 of an application (e.g., application 106-1 in FIG. 1) via a firewall 206. Presentation layer 204 sends the data submitted by user 202 together with associated metadata to validation engine 104 via firewall 210. The metadata describes the type of submitted data and may be based on the context of the submitted data or fields of a form that include the data. Validation engine 104 validates the data based on what the metadata specifies about the data. Validation engine 104 passes the validated data to an application layer 212 of the aforementioned application via firewall 214. Application layer 212 then passes the validated data to a database layer 216 of the aforementioned application via a firewall 218.

Figure 3:
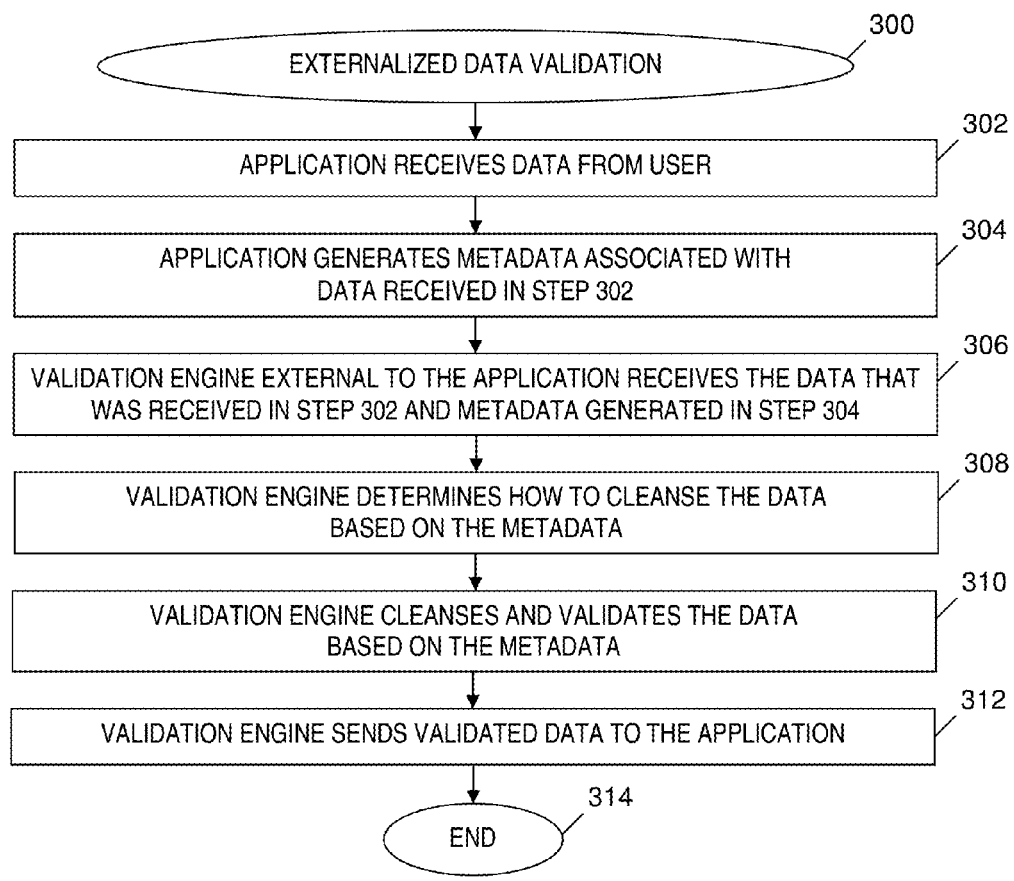
FIG. 3 is a flowchart of a process of externalized data validation that is implemented in the system of FIG. 1, in accordance with embodiments of the present invention.

FIG. 3 is a flowchart of a process of externalized data validation that is implemented in the system of FIG. 1, in accordance with embodiments of the present invention. The process of validating data with an externalized validation engine starts at step 300. In step 302, application 106-1 (see FIG. 1) receives data being input into the application by user 202 (see FIG. 2). In one embodiment, presentation layer 204 (see FIG. 2) of application 106-1 (see FIG. 1) receives the data in step 302. It should be noted that the present invention contemplates that any of the N applications depicted in FIG. 1 may be substituted for application 106-1 in the discussion of FIG. 3.

In step 304, application 106-1 (see FIG. 1) generates metadata that describes attributes of the data received in step 302. In one embodiment, the metadata specifies the type of the data received in step 302. In one embodiment, presentation layer 204 (see FIG. 1) of application 106-1 (see FIG. 1) generates the aforementioned metadata in step 304.

In step 306, validation engine 104 (see FIG. 1 and FIG. 2) receives the data that was received in step 302 and the metadata that was generated in step 304. In one embodiment, validation engine 104 (see FIG. 1 and FIG. 2) receives the aforementioned data and metadata from presentation layer 204 (see FIG. 2). The validation engine 104 (see FIG. 1 and FIG. 2) that receives the data and metadata in step 306 is external to application 106-1 (see FIG. 1).

In step 308, validation engine 104 (see FIG. 1 and FIG. 2) determines one or more methods of cleansing the data that was received in step 306. The determination in step 308 of the method(s) that cleanse the data is based on the metadata received in step 306. In one embodiment, step 308 includes validation engine 104 (see FIG. 1 and FIG. 2) receiving an index from application 106-1 (see FIG. 1), where the index associates the metadata received in step 306 with the aforementioned method(s) for cleansing the data.

In step 310, validation engine 104 (see FIG. 1 and FIG. 2) cleanses and validates the data based on the metadata received in step 306 and the method(s) determined in step 308. In one embodiment, validating the data in step 310 includes determining the data matches signatures that indicate valid input to application 106-1 (see FIG. 1). The aforementioned signatures may be determined and stored prior to step 302.

In step 312, validation engine 104 (see FIG. 1 and FIG. 2) sends the data validated in step 310 to application 106-1 (see FIG. 1). In one embodiment, step 312 sends the validated data to application layer 212 (see FIG. 2) and to database layer 216 (see FIG. 2) of application 106-1 (see FIG. 1). Following step 312, the process of FIG. 3 ends at step 314.

In one embodiment, program code for cleansing and/or validating the data in step 310 is audited by auditing code that is included in validation engine 104 (see FIG. 1 and FIG. 2) and is not included in applications 106-1 . . . 106-N (see FIG. 1).

In one embodiment, a cryptographic algorithm is included in code for performing the validating in step 310. The cryptographic algorithm may be certified by certifying code that is included in validation engine 104 (see FIG. 1 and FIG. 2) and is not included in applications 106-1 . . . 106-N (see FIG. 1).

In one embodiment, step 310 includes validation engine 104 (see FIG. 1 and FIG. 2) caching the result of cleansing and validating a data item being input to a first software application included in the plurality of applications 106-1 . . . 106-N (see FIG. 1). Validation engine 104 (see FIG. 1 and FIG. 2) receives a request from a second software application to validate input of the data item (i.e., the same data item that was input to the first software application) into the second software application. The second software application is included in the plurality of applications 106-1 . . . 106-N (see FIG. 1) and is different from the aforementioned first software application. In response to receiving the request from the second software application, the validation engine sends the cached result of the validation of the data item to the second software application without performing the validation routine that had been used to validate the data item being input into the first software application. That is, running an expensive validation routine for a data item input into a second application may be avoided by having the validation engine cache the result of a previous validation of the same data item for a first application and provide the previous validation result to the second application.

For example, Application 1 may try to determine if 123456789 is a valid credit card number for XYZ Credit Card Company using a Luhn validation routine. The validation engine 104 (see FIG. 1 and FIG. 2) runs the Luhn validation routine and caches the result of the attempt to validate 123456789. The validation engine later sends the same result to Application 2 without running the Luhn routine in response to Application 2 requesting an attempt to validate 123456789 as a credit card number for XYZ Credit Card Company.

Figure 4:
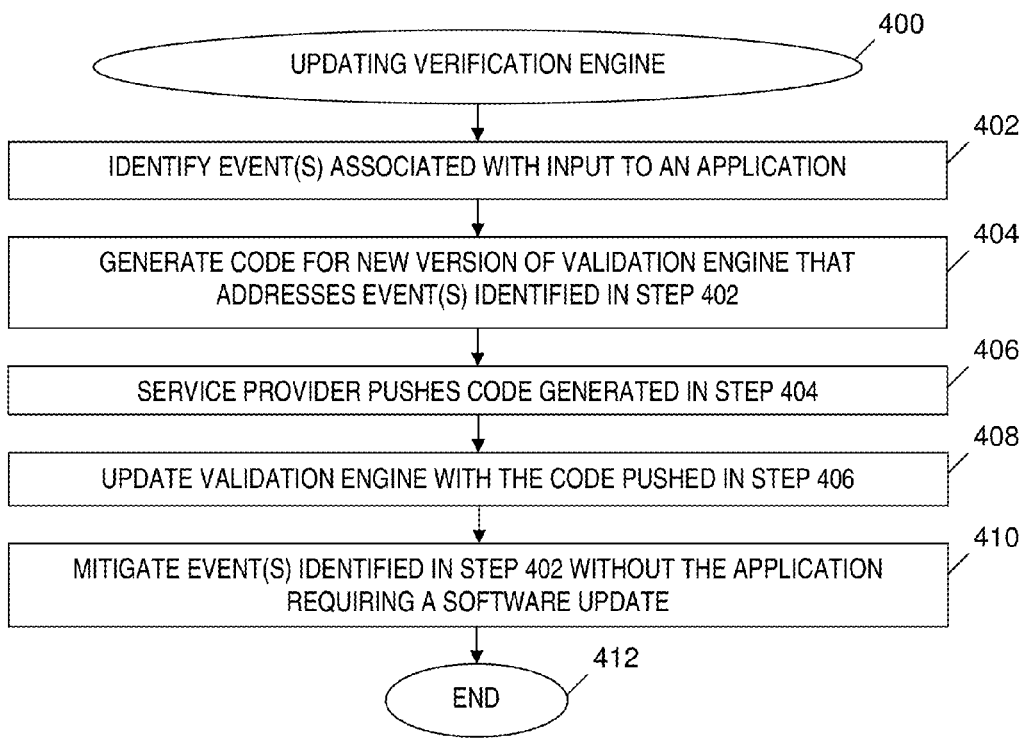
FIG. 4 is a flowchart of a process of updating a verification engine included in the system of FIG. 1, in accordance with embodiments of the present invention.

FIG. 4 is a flowchart of a process of updating a verification engine included in the system of FIG. 1, in accordance with embodiments of the present invention. The process of updating verification engine 104 (see FIG. 1 and FIG. 2) starts at step 400. In step 402, service provider 108 (see FIG. 1) monitors for events and identifies one or more events associated with input to application 106-1 (see FIG. 1). Although the discussion of FIG. 4 references application 106-1, the present invention contemplates that any of the other applications depicted in FIG. 1 may be substituted for application 106-1.

In step 404, service provider 108 (see FIG. 1) generates program code for a new version of validation engine 104 (see FIG. 1 and FIG. 2) that addresses the event(s) identified in step 402. The program code may include updated and/or new validation rules that address the event(s) identified in step 402.

In step 406, service provider 108 (see FIG. 1) pushes the code generated in step 404 to computer system 102 (see FIG. 1).

In step 408, computer system 102 (see FIG. 1) updates validation engine 104 (see FIG. 1) with the code pushed in step 406, so that the updated validation engine is the new version that addresses the event(s) identified in step 402.

In step 410, the updated validation engine mitigates the event(s) identified in step 402 (e.g., by using updated and/or new validation rules to validate input) without requiring an update of program code of application 106-1 (see FIG. 1). The process of FIG. 4 ends at step 412.

Figure 5:
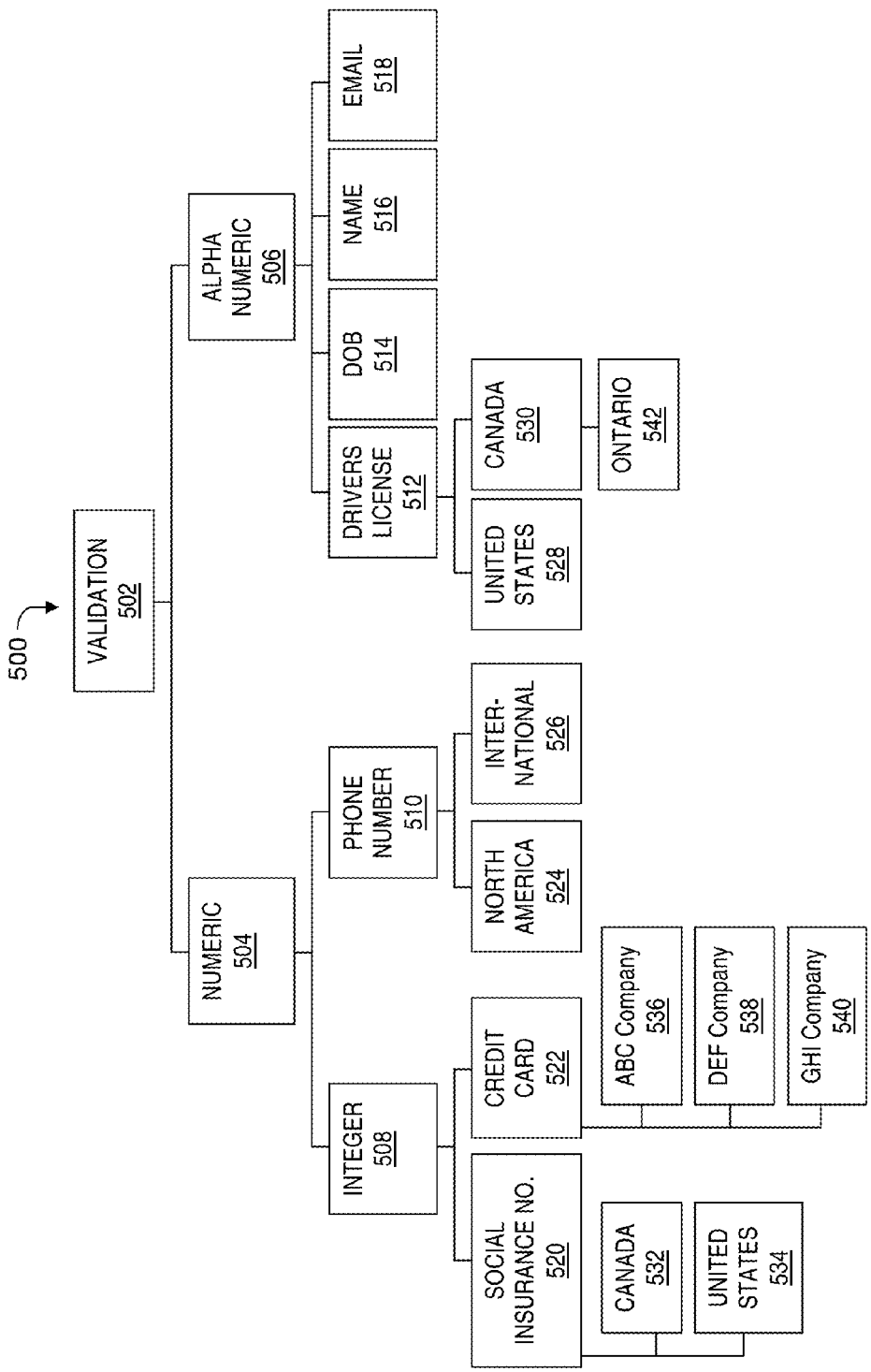
FIG. 5 is an example of a validation class hierarchy utilized by a validation engine included in the system of FIG. 1, in accordance with embodiments of the present invention.

FIG. 5 is an example of a validation class hierarchy utilized by a validation engine included in the system of FIG. 1, in accordance with embodiments of the present invention. Class hierarchy 500 depicts an example different kinds of data understood by validation engine 104 (see FIG. 1 and FIG. 2). Class hierarchy 500 includes Validation 502 class that includes data types Numeric 504 and Alphanumeric 506. The Numeric 504 type includes the data types Integer 508 and Phone Number 510. Alphanumeric 506 type includes the following data types: Drivers License 512, DOB (i.e., Date of Birth) 514, Name 516 and Email 518. Integer 508 includes the data types Social Insurance No. 520 and Credit Card 522. Phone Number 510 includes the data types North America 524 and International 526. Drivers License 512 includes the data types United States 528 and Canada 530. Social Insurance No. 520 includes the data types Canada 532 and United States 534. Credit Card 522 includes the following data types corresponding to credit card companies: ABC Company 536, DEF Company 538 and GHI Company 540. Canada 530 includes the data type Ontario 542 to indicate an Ontario Drivers License.

Computer System

Figure 6:
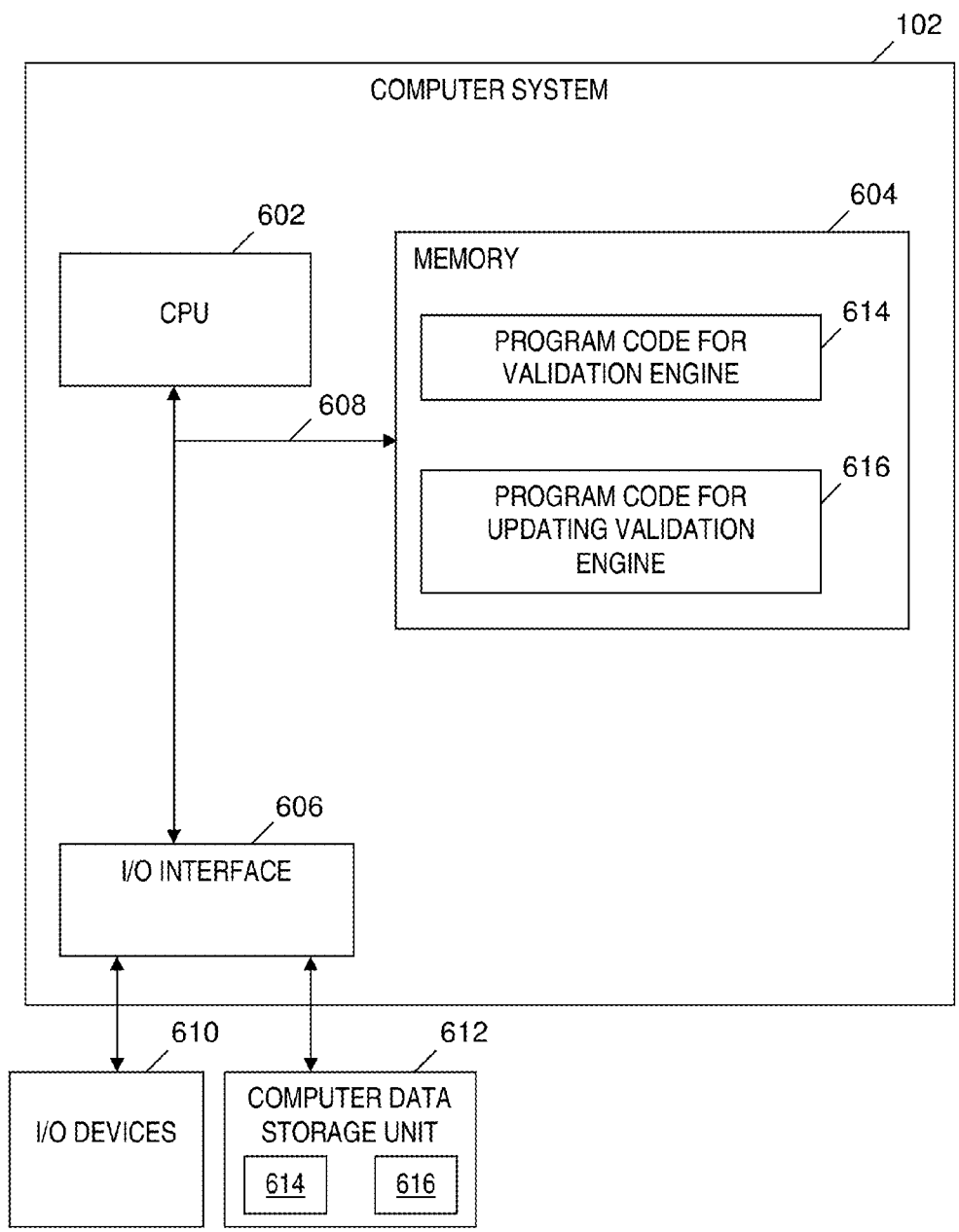
FIG. 6 is a block diagram of a computer system that is included in the system of FIG. 1 and that implements the process of FIG. 3, in accordance with embodiments of the present invention.

FIG. 6 is a block diagram of a computer system that is included in the system of FIG. 1 and that implements the processes of FIG. 3 and FIG. 4, in accordance with embodiments of the present invention. Computer system 102 generally comprises a central processing unit (CPU) 602, a memory 604, an input/output (I/O) interface 606, and a bus 608. Further, computer system 102 is coupled to I/O devices 610 and a computer data storage unit 612. CPU 602 performs computation and control functions of computer system 102, including carrying out instructions included in program code 614 and 616 to perform externalized data validation, where the instructions are carried out by CPU 602 via memory 604. CPU 602 may comprise a single processing unit, or be distributed across one or more processing units in one or more locations (e.g., on a client and server).

Memory 604 may comprise any known computer-readable storage medium, which is described below. In one embodiment, cache memory elements of memory 604 provide temporary storage of at least some program code (e.g., program code 614 and 616) in order to reduce the number of times code must be retrieved from bulk storage while instructions of the program code are carried out. Moreover, similar to CPU 602, memory 604 may reside at a single physical location, comprising one or more types of data storage, or be distributed across a plurality of physical systems in various forms. Further, memory 604 can include data distributed across, for example, a local area network (LAN) or a wide area network (WAN).

I/O interface 606 comprises any system for exchanging information to or from an external source. I/O devices 610 comprise any known type of external device, including a display device (e.g., monitor), keyboard, mouse, printer, speakers, handheld device, facsimile, etc. Bus 608 provides a communication link between each of the components in computer system 102, and may comprise any type of transmission link, including electrical, optical, wireless, etc.

I/O interface 606 also allows computer system 102 to store information (e.g., data or program instructions such as program code 614 and 616) on and retrieve the information from computer data storage unit 612 or another computer data storage unit (not shown). Computer data storage unit 612 may comprise any known computer-readable storage medium, which is described below. For example, computer data storage unit 612 may be a non-volatile data storage device, such as a magnetic disk drive (i.e., hard disk drive) or an optical disc drive (e.g., a CD-ROM drive which receives a CD-ROM disk).

Memory 604 and/or storage unit 612 may store computer program code 614 and 616 that includes instructions that are carried out by CPU 602 via memory 604 to perform externalized data validation. Although FIG. 6 depicts memory 604 as including program code 614 and 616, the present invention contemplates embodiments in which memory 604 does not include all of code 614 and 616 simultaneously, but instead at one time includes only code 614, only code 616, only a portion of code 614 and/or 616, or a combination of code 614 and 616.

Further, memory 604 may include other systems not shown in FIG. 6, such as an operating system (e.g., Linux) that runs on CPU 602 and provides control of various components within and/or connected to computer system 102.

Storage unit 612 and/or one or more other computer data storage units (not shown) that are coupled to computer system 102 may store rules utilized by validation engine 104 (see FIG. 1 and FIG. 2) to cleanse and validate data (see step 310 in FIG. 3).

As will be appreciated by one skilled in the art, the present invention may be embodied as a system, method or computer program product. Accordingly, an aspect of an embodiment of the present invention may take the form of an entirely hardware aspect, an entirely software aspect (including firmware, resident software, micro-code, etc.) or an aspect combining software and hardware aspects that may all generally be referred to herein as a "module". Furthermore, an embodiment of the present invention may take the form of a computer program product embodied in one or more computer-readable medium(s) (e.g., memory 604 and/or computer data storage unit 612) having computer-readable program code (e.g., program code 614 and 616) embodied or stored thereon.

Any combination of one or more computer-readable mediums (e.g., memory 604 and computer data storage unit 612) may be utilized. The computer readable medium may be a computer-readable signal medium or a computer-readable storage medium. In one embodiment the computer-readable storage medium is a computer-readable storage device or computer-readable storage apparatus. A computer-readable storage medium may be, for example, but not limited to, an electronic, magnetic, optical, electromagnetic, infrared or semiconductor system, apparatus, device or any suitable combination of the foregoing. A non-exhaustive list of more specific examples of the computer-readable storage medium includes: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be a tangible medium that can contain or store a program (e.g., program 614 and program 616) for use by or in connection with a system, apparatus, or device for carrying out instructions.

A computer readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with a system, apparatus, or device for carrying out instructions.

Program code (e.g., program code 614 and 616) embodied on a computer-readable medium may be transmitted using any appropriate medium, including but not limited to wireless, wireline, optical fiber cable, RF, etc., or any suitable combination of the foregoing.

Computer program code (e.g., program code 614 and 616) for carrying out operations for aspects of the present invention may be written in any combination of one or more programming languages, including an object oriented programming language such as Java®, Smalltalk, C++ or the like and conventional procedural programming languages, such as the "C" programming language or similar programming languages. Instructions of the program code may be carried out entirely on a user's computer, partly on the user's computer, as a stand-alone software package, partly on the user's computer and partly on a remote computer or entirely on the remote computer or server, where the aforementioned user's computer, remote computer and server may be, for example, computer system 102 or another computer system (not shown) having components analogous to the components of computer system 102 included in FIG. 6. In the latter scenario, the remote computer may be connected to the user's computer through any type of network (not shown), including a LAN or a WAN, or the connection may be made to an external computer (e.g., through the Internet using an Internet Service Provider).

Aspects of the present invention are described herein with reference to a work flow illustration (e.g., FIG. 2), flowchart illustrations (e.g., FIG. 3 and FIG. 4) and/or block diagrams of methods, apparatus (systems) (e.g., FIG. 1 and FIG. 6), and computer program products according to embodiments of the invention. It will be understood that each block of the flowchart illustrations and/or block diagrams, and combinations of blocks in the flowchart illustrations and/or block diagrams, can be implemented by computer program instructions (e.g., program code 614 or 616). These computer program instructions may be provided to one or more hardware processors (e.g., CPU 602) of a general purpose computer, special purpose computer, or other programmable data processing apparatus to produce a machine, such that the instructions, which are carried out via the processor(s) of the computer or other programmable data processing apparatus, create means for implementing the functions/acts specified in the flowchart and/or block diagram block or blocks.

These computer program instructions may also be stored in a computer-readable medium (e.g., memory 604 or computer data storage unit 612) that can direct a computer (e.g., computer system 102), other programmable data processing apparatus, or other devices to function in a particular manner, such that the instructions (e.g., program 614 and 616) stored in the computer-readable medium produce an article of manufacture including instructions which implement the function/act specified in the flowchart and/or block diagram block or blocks.

The computer program instructions may also be loaded onto a computer (e.g., computer system 102), other programmable data processing apparatus, or other devices to cause a series of operational steps to be performed on the computer, other programmable apparatus, or other devices to produce a computer implemented process such that the instructions (e.g., program 614 and 616) which are carried out on the computer, other programmable apparatus, or other devices provide processes for implementing the functions/acts specified in the flowchart and/or block diagram block or blocks.

Any of the components of an embodiment of the present invention can be deployed, managed, serviced, etc. by a service provider that offers to deploy or integrate computing infrastructure with respect to performing externalized data validation. Thus, an embodiment of the present invention discloses a process for supporting computer infrastructure, wherein the process comprises providing at least one support service for at least one of integrating, hosting, maintaining and deploying computer-readable code (e.g., program code 614 and 616) in a computer system (e.g., computer system 102) comprising one or more processors (e.g., CPU 602), wherein the processor(s) carry out instructions contained in the code causing the computer system to perform externalized data validation.

In another embodiment, the invention provides a method that performs the process steps of the invention on a subscription, advertising and/or fee basis. That is, a service provider, such as a Solution Integrator, can offer to create, maintain, support, etc. a process of performing externalized data validation. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

The work flow in FIG. 2, the flowcharts in FIG. 3 and FIG. 4 and the block diagrams in FIG. 1 and FIG. 6 illustrate the architecture, functionality, and operation of possible implementations of systems, methods, and computer program products according to various embodiments of the present invention. In this regard, each block in the flowchart or block diagrams may represent a module, segment, or portion of code (e.g., program code 614 and 616), which comprises one or more executable instructions for implementing the specified logical function(s). It should also be noted that, in some alternative implementations, the functions noted in the block may occur out of the order noted in the figures. For example, two blocks shown in succession may, in fact, be performed substantially concurrently, or the blocks may sometimes be performed in reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method of validating data, said method comprising:
a computer receiving a data item input to a first software application included in a plurality of software applications;
said computer receiving metadata specifying a type of said received data item;
based on said received metadata, said computer determining a method to cleanse said received data item;
based on said received metadata and based on said method to cleanse said received data item, said computer cleansing and validating said data item input to said first software application by said computer running a software-based validation engine, and external to said plurality of software applications;
said computer caching a result of said cleansing and validating said data item input to said first software application;
said computer receiving a request from a second software application included in the plurality of software applications to validate a data item input to said second software application;
said computer determining said data item input to said second software application is identical to said data item input to said first software application;
based on said received request from said second software application to validate said data item input to said second software application and based on said data item input to said second software application being identical to said data item input to said first software application, said computer validating said data item input to said second software application by sending said cached result of said cleansing and validating said data item input to said first software application to said second software application, without requiring an additional step of running said software-based validation engine to validate said data item input to said second software application; and
wherein said received data item is a credit card number, wherein said running said software-based validation engine includes said computer running a Luhn validation routine to validate said credit card number input to said first software application, wherein said receiving said request from said second software application includes said computer receiving a request to validate said credit card number input to said second software application, and wherein said sending said cached result of said cleansing and validating includes said computer sending a result of said running said Luhn validation routine to said second software application to validate said credit card number input to said second software application without requiring an additional step of running said Luhn validation route to validate said credit card number input to said second software application.

2. The method of claim 1, further comprising:
said computer obtaining a subscription for a service provider to dynamically provide updates of said validation engine;
based on said obtained subscription for said service provider to dynamically provide updates of said validation engine, said computer receiving code from said service provider for an update of said validation engine, wherein said update of said validation engine addresses a new event associated with input to a software application included in said plurality of software applications;
said computer updating said validation engine with said received code; and
said computer mitigating said new event associated with said input to said software application by running said updated validation engine without requiring said software application to be updated to mitigate said new event.

3. The method of claim 1, further comprising said computer auditing code for performing said cleansing and validating, wherein said audited code is included in said validation engine and is not included in said plurality of software applications.

4. The method of claim 1, further comprising said computer certifying a cryptographic algorithm included in code for performing said validating, wherein said certified cryptographic algorithm is included in said validation engine and is not included in said plurality of software applications.

5. The method of claim 1, further comprising said computer receiving signatures that are valid based on requirements of input to said plurality of software applications, wherein said validating said received data item is based on said received signatures.

6. The method of claim 1, wherein said determining said method to cleanse said received data item includes said computer receiving an index that associates said received metadata with said method to cleanse said received data.

7. A computer program product comprising a non-transitory computer-readable, tangible storage device coupled to a processor of a computer system, said storage device having computer-readable program code stored therein, said computer-readable program code containing instructions that are carried out by said processor to implement a method of validating data, said method comprising:
said computer system receiving a data item input to a first software application included in a plurality of software applications;
said computer system receiving metadata specifying a type of said received data item;
based on said received metadata, said computer system determining a method to cleanse said received data item;
based on said received metadata; based on said received metadata and based on said method to cleanse said received data item, said computer system cleansing and validating said data item input to said first software application by said computer system running a software-based validation engine external to said plurality of software applications;
said computer system caching a result of said cleansing and validating said data item input to said first software application;
said computer system receiving a request from a second software application included in the plurality of software applications to validate a data item input to said second software application;
said computer determining said data item input to said second software application is identical to said data item input to said first software application;
based on said received request from said second software application to validate said data item input to said second software application and based on said data item input to said second software application being identical to said data item input to said first software application, said computer system validating said data item input to said second software application by sending said cached result of said cleansing and validating said data item input to said first software application to said second software application, without requiring an additional step of running said software-based validation engine to validate said data item input to said second software application; and wherein said received data item is a credit card number, wherein said running said software-based validation engine includes said computer system running a Luhn validation routine to validate said credit card number input to said first software application, wherein said receiving said request from said second software application includes said computer system receiving a request to validate said credit card number input to said second software application, and wherein said sending said cached result of said cleansing and validating includes said computer system sending a result of said running said Luhn validation routine to said second software application to validate said credit card number input to said second software application without requiring an additional step of running said Luhn validation route to validate said credit card number input to said second software application.

8. The program product of claim 7, wherein said method further comprises:
said computer system obtaining a subscription for a service provider to dynamically provide updates of said validation engine;
based on said obtained subscription for said service provider to dynamically provide updates of said validation engine, said computer system receiving code from said service provider for an update of said validation engine, wherein said update of said validation engine addresses a new event associated with input to a software application included in said plurality of software applications;
said computer system updating said validation engine with said received code; and
said computer system mitigating said new event associated with said input to said software application by running said updated validation engine without requiring said software application to be updated to mitigate said new event.

9. The program product of claim 7, wherein said method further comprises said computer system auditing code for performing said cleansing and validating, wherein said audited code is included in said validation engine and is not included in said plurality of software applications.

10. The program product of claim 7, wherein said method further comprises said computer system certifying a cryptographic algorithm included in code for performing said validating, wherein said certified cryptographic algorithm is included in said validation engine and is not included in said plurality of software applications.

11. The program product of claim 7, wherein said method further comprises said computer system receiving signatures that are valid based on requirements of input to said plurality of software applications, wherein said validating said received data item is based on said received signatures.

12. The program product of claim 7, wherein said determining said method to cleanse said received data item includes said computer system receiving an index that associates said received metadata with said method to cleanse said received data.

13. A process for supporting computing infrastructure, said process comprising providing at least one support service for at least one of creating, integrating, hosting, maintaining, and deploying computer-readable code in a computer comprising a central processing unit (CPU), wherein said CPU carries out instructions contained in said code causing said computer to perform a method of validating data, said method comprising:
said computer receiving a data item input to a first software application included in t-e-a plurality of software applications;
said computer receiving metadata specifying a type of said received data item; based on said received metadata, said computer determining a method to cleanse said received data item;
based on said received metadata; based on said received metadata and based on said method to cleanse received data item, said computer cleansing and validating said data item input to said first software application by said computer running a software-based validation engine external to said plurality of software applications;
said computer caching a result of said cleansing and validating said data item input to said first software application;
said computer receiving a request from a second software application included in the plurality of software applications to validate a data item input to said second software application;
said computer determining said data item input to said second software application is identical to said data item input to said first software application: based on said received request from said second software application to validate said data item input to said second software application and based on said data item input to said second software application being identical to said data item input to said first software application, said computer validating said data item input to said second software application by sending said cached result of said cleansing and validating said data item input to said first software application to said second software application, without requiring an additional step of running said software-based validation engine to validate said data item input to said second software application; and wherein said received data item is a credit card number, wherein said running said software-based validation engine includes said computer running a Luhn validation routine to validate said credit card number input to said first software application, wherein said receiving said request from said second software application includes said computer receiving a request to validate said credit card number input to said second software application, and wherein said sending said cached result of said cleansing and validating includes said computer sending a result of said running said Luhn validation routine to said second software application to validate said credit card number input to said second software application without requiring an additional step of running said Luhn validation route to validate said credit card number input to said second software application.

14. The process of claim 13, wherein said method further comprises:
said computer obtaining a subscription for a service provider to dynamically provide updates of said validation engine;
based on said obtained subscription for said service provider to dynamically provide updates of said validation engine, said computer receiving code from said service provider for an update of said validation engine, wherein said update of said validation engine addresses a new event associated with input to a software application included in said plurality of software applications;

said computer updating said validation engine with said received code; and said computer mitigating said new event associated with said input to said software application by running said updated validation engine without requiring said software application to be updated to mitigate said new event.

15. The process of claim 13, wherein said method further comprises said computer auditing code for performing said cleansing and validating, wherein said audited code is included in said validation engine and is not included in said plurality of software applications.

16. The process of claim 13, wherein said method further comprises said computer certifying a cryptographic algorithm included in code for performing said validating, wherein said certified cryptographic algorithm is included in said validation engine and is not included in said plurality of software applications.

17. The process of claim 13, wherein said method further comprises said computer receiving signatures that are valid based on requirements of input to said plurality of software applications, wherein said validating said received data item is based on said received signatures.

* * * * *